United States Patent
Hellring et al.

(10) Patent No.: US 9,761,903 B2
(45) Date of Patent: Sep. 12, 2017

(54) LITHIUM ION BATTERY ELECTRODES INCLUDING GRAPHENIC CARBON PARTICLES

(71) Applicant: PPG Industries Ohio, Inc., Cleveland, OH (US)

(72) Inventors: Stuart D. Hellring, Pittsburgh, PA (US); Randy E. Daughenbaugh, Monroeville, PA (US); Noel R. Vanier, Wexford, PA (US); Cheng-Hung Hung, Wexford, PA (US); John W. Burgman, Brecksville, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/530,007

(22) Filed: Oct. 31, 2014

(65) Prior Publication Data
US 2015/0056516 A1  Feb. 26, 2015

Related U.S. Application Data

(63) Continuation-in-part of application No. 14/348,280, filed as application No. PCT/US2012/057811 on Sep.
(Continued)

(51) Int. Cl.
*H01M 4/38* (2006.01)
*H01M 10/0525* (2010.01)
(Continued)

(52) U.S. Cl.
CPC ....... *H01M 10/0525* (2013.01); *H01M 4/625* (2013.01); *H01M 4/131* (2013.01); *H01M 4/136* (2013.01); *H01M 4/623* (2013.01)

(58) Field of Classification Search
CPC ....... H01M 4/38; H01M 10/0525; H01M 4/62
(Continued)

(56) References Cited

U.S. PATENT DOCUMENTS

| 4,851,262 A | 7/1989 | McFeaters |
| 5,486,675 A | 1/1996 | Taylor et al. |

(Continued)

FOREIGN PATENT DOCUMENTS

| CN | 102877109 A | 1/2013 |
| CN | 103468057 A | 12/2013 |

(Continued)

OTHER PUBLICATIONS

Bergeron, Emmanuel "Production of Carbon by Pyrolysis of Methane in Thermal Plasma", Master's Thesis in Applied Sciences, University of Sherbrooke, Faculty of Applied Sciences, Department of Chemical Engineering, Quebec, Canada, Oct. 1997.
(Continued)

Primary Examiner — Daniel C McCracken
(74) Attorney, Agent, or Firm — Alan G. Towner

(57) ABSTRACT

Lithium ion battery electrodes including graphenic carbon particles are disclosed. Lithium ion batteries containing such electrodes are also disclosed. The graphenic carbon particles may be used in cathodes of such batteries by depositing a graphenic carbon particle-containing coating of a conductive substrate such as a metal foil The use of graphenic carbon particles in the cathodes results in improved performance of the lithium ion batteries.

17 Claims, 5 Drawing Sheets

Related U.S. Application Data 28, 2012, now Pat. No. 9,221,688, which is a continuation of application No. 13/249,315, filed on Sep. 30, 2011, now Pat. No. 8,486,363, and a continuation of application No. 13/309,894, filed on Dec. 2, 2011, now Pat. No. 8,486,364.

(51) Int. Cl.
  *H01M 4/62* (2006.01)
  *H01M 4/131* (2010.01)
  *H01M 4/136* (2010.01)

(58) Field of Classification Search
  USPC .................................... 429/231.95; 252/506
  See application file for complete search history.

(56) References Cited

U.S. PATENT DOCUMENTS

| | | | |
|---|---|---|---|
| 5,527,518 A | 6/1996 | Lynum et al. | |
| 5,749,937 A | 5/1998 | Detering et al. | |
| 5,763,548 A | 6/1998 | Matyjaszewski et al. | |
| 5,788,738 A | 8/1998 | Pirzada et al. | |
| 5,789,487 A | 8/1998 | Matyjaszewski et al. | |
| 5,807,937 A | 9/1998 | Matyjaszewski et al. | |
| 5,851,507 A | 12/1998 | Pirzada et al. | |
| 5,935,293 A | 8/1999 | Detering et al. | |
| 5,984,997 A | 11/1999 | Bickmore et al. | |
| 5,989,648 A | 11/1999 | Phillips | |
| 6,099,696 A | 8/2000 | Schwob et al. | |
| 6,228,904 B1 | 5/2001 | Yadav et al. | |
| 6,316,119 B1 | 11/2001 | Metzger et al. | |
| 6,358,375 B1 | 3/2002 | Schwob | |
| 6,441,066 B1 | 8/2002 | Woodworth et al. | |
| RE37,853 E | 9/2002 | Detering et al. | |
| 6,652,967 B2 | 11/2003 | Yadav et al. | |
| 6,669,823 B1 | 12/2003 | Sarkas et al. | |
| 6,689,192 B1 | 2/2004 | Phillips et al. | |
| 6,716,525 B1 | 4/2004 | Yadav et al. | |
| 6,719,821 B2 | 4/2004 | Yadav et al. | |
| 6,786,950 B2 | 9/2004 | Yadav et al. | |
| 6,821,500 B2 | 11/2004 | Fincke et al. | |
| 6,830,822 B2 | 12/2004 | Yadav | |
| 6,849,109 B2 | 2/2005 | Yadav et al. | |
| 7,071,258 B1 | 7/2006 | Jang et al. | |
| 7,635,458 B1 | 12/2009 | Hung et al. | |
| 7,754,184 B2 | 7/2010 | Mercuri | |
| 7,776,303 B2 | 8/2010 | Hung et al. | |
| 7,785,492 B1 | 8/2010 | Jang et al. | |
| 7,790,285 B2 | 9/2010 | Zhamu et al. | |
| 7,824,741 B2 | 11/2010 | Sandhu | |
| 7,842,271 B2 | 11/2010 | Petrik | |
| 8,047,248 B2 | 11/2011 | Prud'homme et al. | |
| 8,048,950 B2 | 11/2011 | Prud'homme et al. | |
| 8,129,466 B2 | 3/2012 | Polk et al. | |
| 8,486,363 B2 | 7/2013 | Hung et al. | |
| 8,486,364 B2 | 7/2013 | Vanier et al. | |
| 2002/0114949 A1 | 8/2002 | Bower et al. | |
| 2002/0182506 A1* | 12/2002 | Cagle ................... B82Y 30/00 | |
| | | | 429/231.8 |
| 2004/0247515 A1 | 12/2004 | Gardner | |
| 2005/0271574 A1 | 12/2005 | Jang et al. | |
| 2006/0093885 A1 | 5/2006 | Krusic et al. | |
| 2006/0121279 A1 | 6/2006 | Petrik | |
| 2006/0216222 A1 | 9/2006 | Jang | |
| 2007/0045116 A1 | 3/2007 | Hung et al. | |
| 2007/0096066 A1 | 5/2007 | Yoshida et al. | |
| 2007/0237705 A1 | 10/2007 | Itoh et al. | |
| 2008/0206124 A1 | 8/2008 | Jang et al. | |
| 2009/0022649 A1 | 1/2009 | Zhamu et al. | |
| 2009/0054581 A1 | 2/2009 | Prud'homme et al. | |
| 2009/0068471 A1 | 3/2009 | Choi et al. | |
| 2009/0075035 A1 | 3/2009 | O'Brien et al. | |
| 2009/0110627 A1 | 4/2009 | Choi et al. | |
| 2009/0117467 A1 | 5/2009 | Zhamu et al. | |
| 2009/0169467 A1 | 7/2009 | Zhamu et al. | |
| 2010/0036023 A1 | 2/2010 | Weng et al. | |
| 2010/0047154 A1 | 2/2010 | Lee et al. | |
| 2010/0055017 A1 | 3/2010 | Vanier et al. | |
| 2010/0055025 A1 | 3/2010 | Jang et al. | |
| 2010/0072430 A1 | 3/2010 | Gergely et al. | |
| 2010/0096597 A1 | 4/2010 | Prud'homme et al. | |
| 2010/0126660 A1 | 5/2010 | O'Hara | |
| 2010/0143798 A1 | 6/2010 | Zhamu et al. | |
| 2010/0247801 A1 | 9/2010 | Zenasni | |
| 2010/0255219 A1 | 10/2010 | Wenxu et al. | |
| 2010/0301212 A1 | 12/2010 | Dato et al. | |
| 2010/0303706 A1 | 12/2010 | Wallace et al. | |
| 2010/0314788 A1 | 12/2010 | Hung et al. | |
| 2010/0323113 A1 | 12/2010 | Ramappa et al. | |
| 2011/0046289 A1 | 2/2011 | Zhamu et al. | |
| 2011/0070426 A1 | 3/2011 | Vanier et al. | |
| 2012/0021160 A1 | 1/2012 | Kariyada | |
| 2012/0058397 A1* | 3/2012 | Zhamu ................... H01M 4/13 | |
| | | | 429/231.8 |
| 2012/0064409 A1 | 3/2012 | Zhamu et al. | |
| 2012/0142832 A1 | 6/2012 | Varma et al. | |
| 2012/0211160 A1 | 8/2012 | Asay et al. | |
| 2012/0277360 A1* | 11/2012 | Scheffer ............... C09D 177/00 | |
| | | | 524/237 |
| 2013/0084236 A1 | 4/2013 | Hung et al. | |
| 2013/0084237 A1* | 4/2013 | Vanier ................... B82Y 30/00 | |
| | | | 423/448 |
| 2014/0057165 A1 | 2/2014 | Yamakaji et al. | |
| 2014/0272591 A1 | 9/2014 | Vanier et al. | |
| 2015/0159024 A1 | 6/2015 | Decker et al. | |

FOREIGN PATENT DOCUMENTS

| | | |
|---|---|---|
| DE | 102011003619 A1 | 8/2012 |
| EP | 2562766 A1 | 2/2013 |
| GB | 2483373 A | 3/2012 |
| KR | 20130013689 A | 2/2012 |
| KR | 20120029530 A | 3/2012 |
| WO | 9840415 A1 | 9/1998 |
| WO | 2009123771 A2 | 10/2009 |
| WO | 2009134492 A2 | 11/2009 |
| WO | 2010107769 A2 | 9/2010 |
| WO | 2011012874 A1 | 2/2011 |
| WO | 2011086391 A1 | 7/2011 |
| WO | 2013049498 A1 | 4/2013 |
| WO | 2013165677 A1 | 11/2013 |
| WO | 2013166414 A2 | 11/2013 |
| WO | 2013192180 A2 | 12/2013 |
| WO | 2014070346 A1 | 5/2014 |
| WO | 2015089026 A1 | 6/2015 |

OTHER PUBLICATIONS

Cassagneau et al., "Preparation of Layer-by-Layer Self-Assembly of Silver Nanoparticles Capped by Graphite Oxide Nanosheets", J. Phys. Chem. B 1999, 103, 1789-1793.

Chen, Shanshan et al. "Oxidation Resistance of Graphene-Coated Cu and Cu/Ni Alloy", ACS Nano, Jan. 28, 2011, pp. 1321-1327.

Choi, Ki Seok et al. "Fabrication of Free-Standing Multilayered Graphene and Poly(3,4-ethylenedioxythiophene) Composite Films with Enhanced Conductive and Mechanical Properties", Langmuir, 26 (15), 2010, pp. 12902-12908.

Coraux, Johann "Growth of Graphene on Ir(111)", New Journal of Physics 11, 2009, 023006, pp. 1-22.

Dato, Albert et al. "Substrate-Free Gas-Phase Synthesis of Graphene Sheets", Nano Letters, vol. 8, No. 7, 2008, pp. 2012-2016.

Dresselhaus MS, et al., "Structure of fullerness", Science of Fullerenes and Carbon Nanotubes, 1996, pp. 60-79, Chapter 3, Elsevier Inc., USA.

Du, X.S. et al. "Facile Synthesis of Highly Conductive Polyaniline/ Graphite Nanocomposites" European Polymer Journal 40, 2000, pp. 1489-1493.

Fincke, James R. et al. "Plasma Pyrolysis of Methane to Hydrogen and Carbon Black" Ind. Eng. Chem. Res., 2002, pp. 1425-1435.

(56) References Cited

OTHER PUBLICATIONS

Fitzer et al., "Recommended Terminology for the Description of Carbon as a Solid", Pure & Appl. Chem. 1995; 67(3): 473-506.
Gannon, Richard E. "Acetylene from Hydrocarbons", Kirk-Othmer Encyclopedia of Chemical Technology, 2003, pp. 1-28.
Gomez De Arco, Lewis et al. "Synthesis, Transfer, and Devices of Single- and Few-Layer Graphene by Chemical Vapor Deposition", IEEE Transactions on Nanotechnology, Vo. 8, No. 2, Mar. 2009, pp. 135-138.
Gonzalez-Aguilar, J. et al. "Carbon Nanostructures Production by Gas-Phase Plasma Processes at Atmospheric Pressure", J. Phys. D: Appl. Phys. 40, 2007, pp. 2361-2374.
Holmen, A. et al. "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976.
Ji, Liwen et al. "Graphene/Si Multilayer Structure Anodes for Advanced Half and Full Lithium-Ion Cells", Nano Energy, 2011.
Kang F-Y, et al., "Effects of carbonaceous materials on the physical and electrochemical performance of a LiFePO4 cathode for lithium-ion batteries", New Carbon Materials, 2011, pp. 161-170, 26(3).
Khan, M.S. et al. "Survey of Recent Methane Pyrolysis Literature", Industrial and Engineering Chemistry, vol. 62, No. 10, Oct. 1970.
Kim, Juhan et al. "Fabrication of Graphene Flakes Composed of Multi-Layer Graphene Sheets using a Thermal Plasma Jet System", Nanotechnology 21, Jan. 29, 2010.
Kim, Keun Su et al. "Continuous Synthesis of Nanostructured Sheetlike Carbons by Thermal Plasma Decomposition of Methane", IEEE Transactions on Plasma Science, vol. 35, No. 2, Apr. 2007.
Kirk-Othmer Encyclopedia of Chemical Technology, "Acetylene From Hydrocarbons", pp. 1-28.
Kostic et al., "Thermodynamic Consideration of B—O—C—H System for Boron Carbide (B4C) Powder Synthesis in Thermal Plasma", 1997, Progress in Plasma Processing of Materials, pp. 889-898.
Lavoie, Martin "Synthesis of Carbon Black From Propane Using a Thermal Plasma", Master's Thesis in Applied Sciences, University of Sherbrooke, Faculty of Applied Sciences, Department of Chemical Engineering, Quebec, Canada, Sep. 1997.
Malesevic, Alexander et al. "Synthesis of Few-Layer Graphene Via Microwave Plasma-Enhanced Chemical Vapour Deposition", Nanotechnology 19, 2008, 305604 (6pps).
Martin-Gallego, M. et al. "Epoxy-Graphene UV-Cured Nanocomposites", Polymer 52, 2011, pp. 4664-4669.
McWilliams A, "Graphene: Technologies, applications, and markets", BCC Res, 2009, pp. 1-25.
McWilliams, Andrew, "Market Research Report, Graphene: Technologies, Applications, and Markets", BCC Research, Feb. 2011.
Nandamuri, G. et al. "Chemical Vapor Deposition of Graphene Films" Nanotechnology 21, 2010, 145604 (4pp.).
Prasai, Dhiraj et al. "Graphene: Corrosion-Inhibiting Coating" ACS Nano, 6 (2), 2012, pp. 1102-1108.
Pristavita, Ramona et al. "Carbon Blacks Produced by Thermal Plasma: the Influence of the Reactor Geometry on the Product Morphology", Plasma Chem Plasma Process, 30, 2010, pp. 267-279.
Pristavita, Ramona et al. "Carbon Nanoparticle Production by Inductively Coupled Thermal Plasmas: Controlling the Thermal History of Particle Nucleation" Plasma Chem Plasma Process, 31, 2011, pp. 851-866.
Pristavita, Ramona et al., "Carbon Nano-Flakes Produced by an Inductively Coupled Thermal Plasma System for Catalyst Applications", Plasma Chem Plasma Process, 31, 2011, pp. 393-403.
Rafiee, Mohammad A. et al., "Enhanced Mechanical Properties of Nanocomposites at Low Graphene Content", ACSNANO, vol. 3, No. 12, 2009.
Skinner, Gordon B. "Pyrolysis of Methane and the C2 Hydrocarbons", Monsanto Chemical Co., Research and Engineering Division, Dayton 7, Ohio, pp. 59-68.
Su F-Y, et al., "Flexible and planar graphene conductive additives for lithium-ion batteries", J Mater Chem, 2010, pp. 9644-9650, 20.
Su, Fang-Yuan et al. "Could Graphene Construct an Effective Conducting Network in a High-Power Lithium Ion Battery?" Nano Energy, Feb. 25, 2012.
Subrahmanyam, K.S. et al. "Simple Method of Preparing Graphene Flakes by an Arc-Discharge Method", The Journal of Physical Chemistry C, vol. 113, No. 11, 2009, pp. 4257-4259.
Tagawa K, et al., "Production processes for fabrication of litium-ion batteries", Lithium Ion Batteries, 2009, pp. 181-194, Chapter 8, Springer, New York, USA.
Tang et al., "Processible Nanostructured Materials with Electrical Conductivity and Magnetic Susceptibility: Preparation and Properties of Maghemite/Polyaniline Nanocomposite Films", Chem. Mater., 1999, 11, 1581-1589.
"Lithium iron phosphate battery", Wikipedia, http://en.wikipedia.org/wiki/Lithium_iron_phosphate_battery, last modified Feb. 27, 2014.
Zhong, Ziyi et al. "Catalytic Growth of Carbon Nanoballs With and Without Cobalt Encapsulation", Chemical Physics Letters 330, 2000, pp. 41-47.

* cited by examiner

LITHIUM ION BATTERY ELECTRODES INCLUDING GRAPHENIC CARBON PARTICLES

CROSS REFERENCE TO RELATED APPLICATIONS

This application is a continuation-in-part of U.S. patent application Ser. No. 14/348,280 filed Mar. 28, 2014, which is a national phase of PCT Int'l Patent Application Serial No. PCT/US2012/057811 filed Sep. 28, 2012 which claims priority to U.S. patent application Ser. No. 13/249,315 filed Sep. 30, 2011, now U.S. Pat. No. 8,486,363 issued Jul. 16, 2013, and also claims priority to U.S. patent application Ser. No. 13/309,894 filed Dec. 2, 2011, now U.S. Pat. No. 8,486,364 issued Jul. 16, 2013, all of which are incorporated herein by reference.

FIELD OF THE INVENTION

The present invention relates to lithium ion battery electrodes including graphenic carbon particles.

BACKGROUND OF THE INVENTION

Lithium ion batteries are well known. Lithium ion battery cathode coatings use conductive carbon to transport electrons from electroactive lithium compounds, such as lithium iron phosphate or nickel, cobalt doped lithium manganate, to a metal foil collector such as aluminum. Graphite anodes in lithium ion batteries also require conductive carbon to carry electrons to collectors such as copper. While essential for the performance of a lithium ion battery during the charge and discharge cycles, conductive carbon adds weight and volume to the electrode coating without contributing to the capacity, or energy density, of the battery. Since batteries are used for energy storage, energy density of a lithium ion battery should be maximized. Ideally a cathode coating would be comprised solely of materials that store energy without carrying the overhead associated with materials that serve other functions but do not store energy like conductive carbon and polymer binders, etc. However, the need to harvest energy from a battery at a high discharge current requires the coating to suffer the addition of conductive carbon to carry charge with maximum power density. This conductive carbon content lowers battery capacity. Using a more highly conductive electron transporting material like the highly conductive graphene evaluated for this invention can increase the percentage of energy storage material in the coating and consequently increase overall battery capacity.

SUMMARY OF THE INVENTION

An aspect of the invention provides a lithium ion battery electrode material comprising a lithium-containing active material, thermally produced graphenic carbon particles, and a binder.

Another aspect of the invention provides a lithium ion battery cathode material comprising a lithium-containing active material, thermally produced graphenic carbon particles, and a binder.

A further aspect of the present invention provides a lithium ion battery comprising an anode, a cathode, a separator between the anode and the cathode, and an electrolyte in contact with the anode and the cathode. The cathode comprises a coating of a lithium-containing active material, thermally produced graphenic carbon particles, and a binder.

DETAILED DESCRIPTION OF EMBODIMENTS OF THE INVENTION

Figure 1:
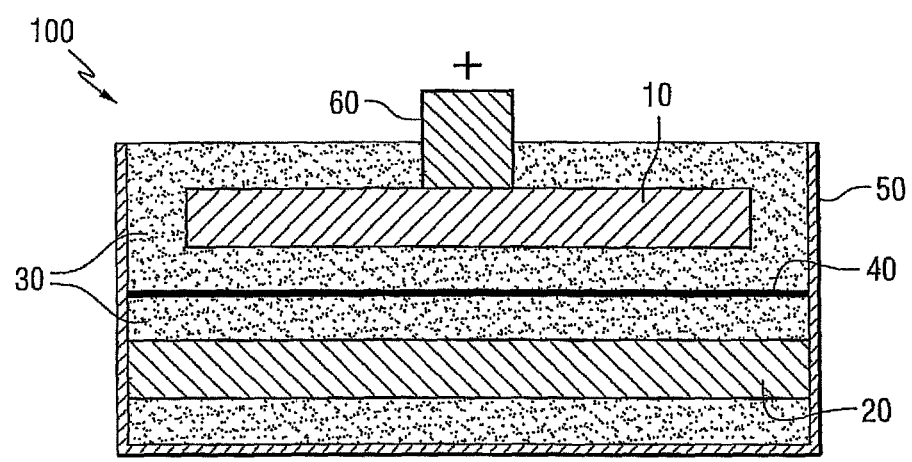
FIG. 1 is a partially schematic side sectional view of a lithium ion battery including a cathode comprising graphenic carbon particles in accordance with an embodiment of the present invention.
Figure 2:
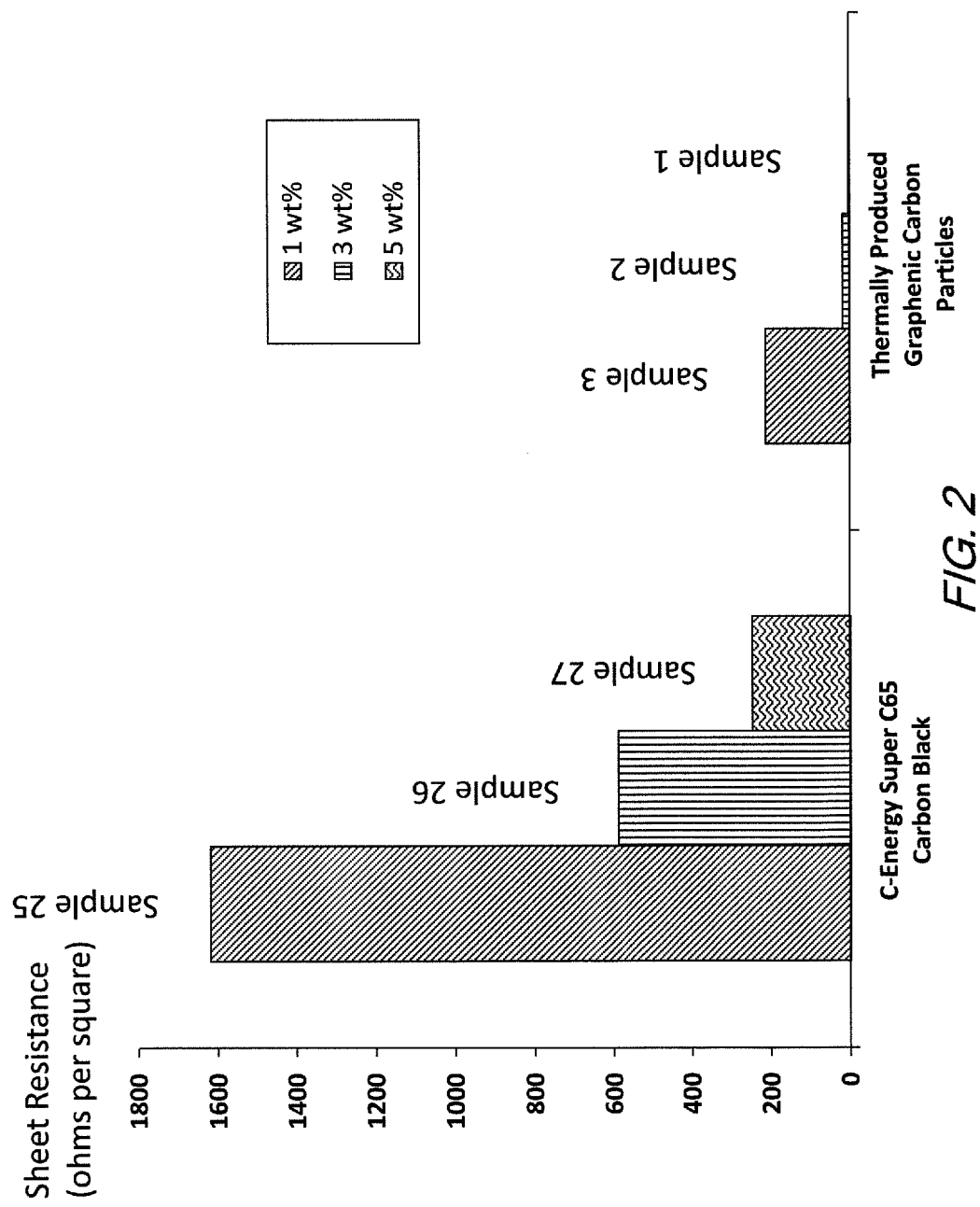
FIGS. 2-5 are graphs showing sheet resistances of various coating samples.
Figure 3:
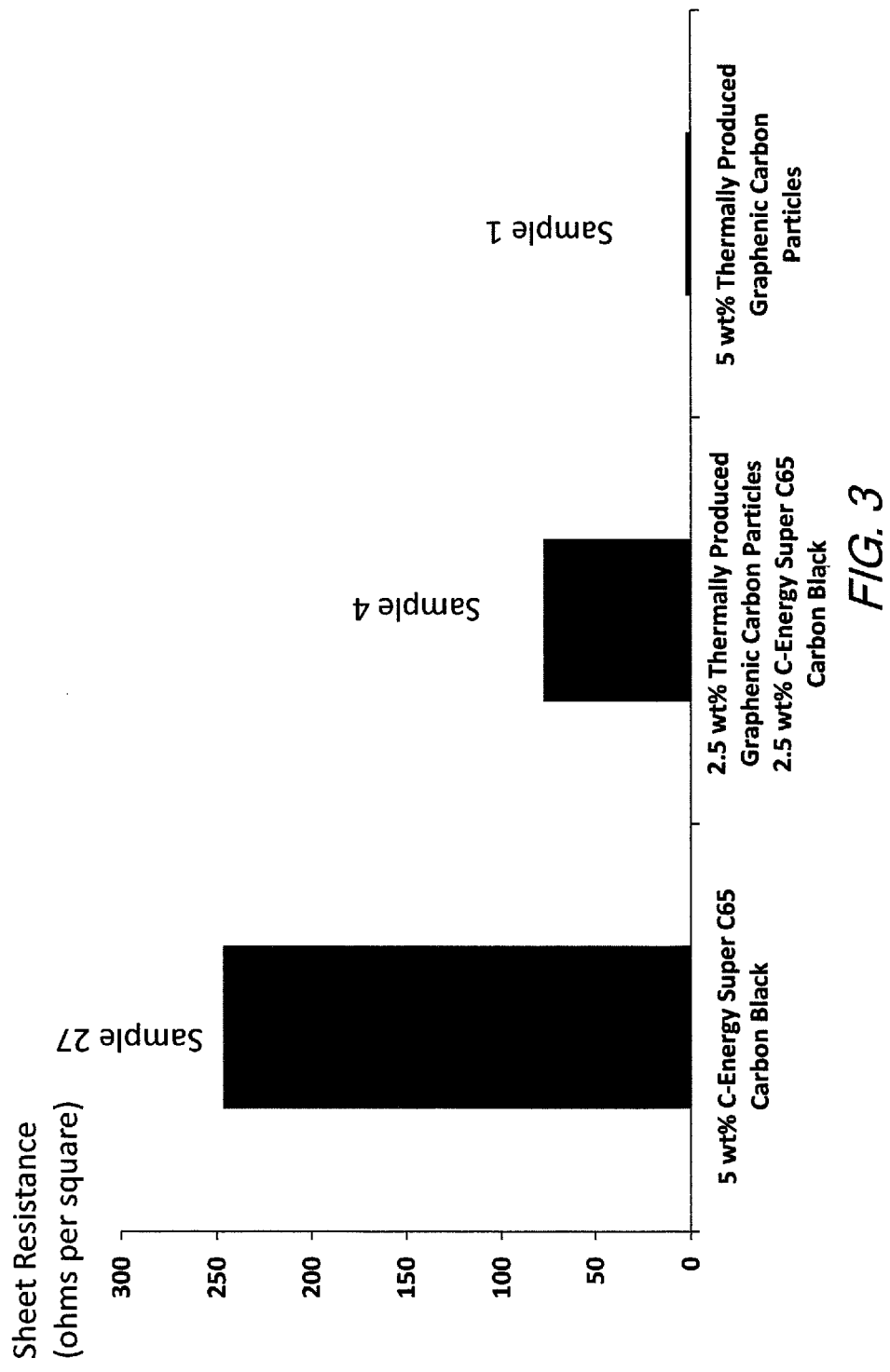
Figures 4, 5:
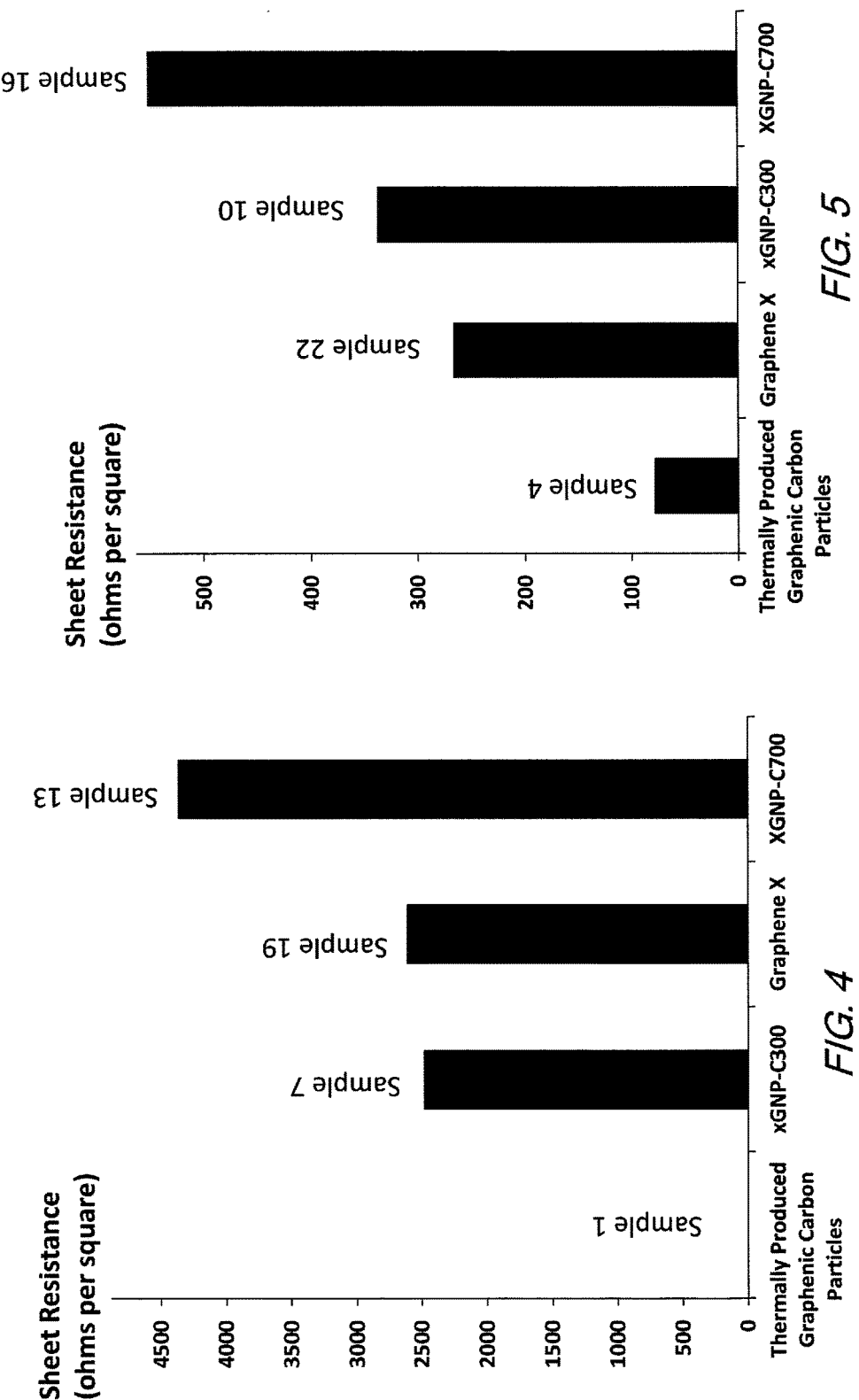

FIG. 1 schematically illustrates a lithium ion battery 100 in accordance with an embodiment of the present invention. The battery 100 includes an anode 20, a cathode 10, a separator 40 between the anode and cathode, and an electrolyte 30 in contact with the anode and cathode. A casing 50 is provided in electrical contact with the anode 20. A terminal 60 is in electrical contact with the cathode 10.

The electrolyte 30 of the lithium ion battery 100 may comprise any known electrolyte material conventionally used in lithium ion batteries, such as lithium-containing electrolyte salts dissolved in organic solvents. Examples of lithium-containing electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, LiCl, LiBr and the like. Examples of organic solvents include propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. In certain embodiments, cyclic carbonates such as propylene carbonate, or chain carbonates such as dimethyl carbonate and diethyl carbonate may be used. These organic solvents can be used singly or in a combination of two types or more. In certain embodiments, the electrolyte 30 may also comprise additives or stabilizers such as VC (vinyl carbonate), VEC (vinyl ethylene carbonate), EA (ethylene acetate), TPP (triphenylphosphate), phosphazenes, LiBOB, LiBETI, LiTFSI, BP (biphenyl), PS (propylene sulfite), ES (ethylene sulfite), AMC (allylmethylcarbonate), and APV (divinyladipate).

The anode 20 of the lithium ion battery 100 may be of any known type such as lithium metal, graphite, lithium titanate, silicon and the like and may comprise a conductive substrate such as copper foil, or other metal foils, having conductive particles deposited on one or both sides thereof. In certain embodiments, the conductive particles may comprise graphenic carbon particles, for example, as disclosed in U.S. application Ser. No. 13/836,415, which is incorporated herein by reference. The graphenic carbon particle-containing anode material may include a mixture of the graphenic carbon particles with lithium-reactive particles such as Si and/or Sn and a binder.

In accordance with embodiments of the invention, the cathode 10 of the lithium ion battery 100 includes a lithium-containing active material, graphenic carbon particles, and a binder. As more fully described below, the graphenic carbon particles may be thermally produced. The cathode may comprise an electrically conductive substrate, for example, a metal foil comprising Al, carbon-coated aluminum foil, aluminum-celmet or the like. A coating of the present cathode material may be deposited and cured on the substrate to form a coating having a typical dry film thickness of from 5 or 10 to 500 microns, for example, from 20 or 25 to 200 microns, for example, from 50 to 100 microns.

The lithium-containing active material of the cathode coating may include $LiFePO_4$, carbon-coated lithium iron phosphate, lithium cobalt oxide, lithium nickel cobalt aluminates, lithium manganate, lithium nickel cobalt manganates and the like. In certain embodiments, the lithium-containing active material comprises from 50 to 99.9 weight percent of the cured cathode coating material, for example, from 80 to 99.5 weight percent, or from 87 to 99 weight percent.

In certain embodiments, the graphenic carbon particles comprise from 0.25 to 25 weight percent of the cured cathode coating material, for example, from 0.5 to 10 weight percent, or from 1 or 2 to 8 weight percent.

In accordance with embodiments of the invention, the type and amount of graphenic carbon particles added to the cathode coating material are selected in order to reduce the electrical resistance of the cathode material to a level typically below 300 ohms/square, for example, below 250 ohms/square, or below 240 ohms/square, or below 200 ohms/square, or below 150 ohms/square. The resistance, in units of ohms/square, may be measured by a standard, commercially available four-point test probe.

The binder may typically include polyvinylidene fluoride (PVDF), acrylics, cellulosics such as carboxymethylcellulose and the like. In certain embodiments, the binder comprises from 0.25 to 25 weight percent of the cured cathode coating material, for example, from 0.5 to 10 weight percent, or from 1 or 2 to 8 weight percent. In certain embodiments, a dispersant such as an acrylic may be added, e.g., the graphenic carbon particles may initially be mixed with a dispersant prior to their mixture with the binder.

In certain embodiments, conductive carbon particles may optionally be added to the cathode coating material. The carbon particles may be in the form of carbon black, graphite and/or carbon nanospheres. The amount of conductive carbon particles added to the cathode coating material may be up to 25 weight percent of the cathode coating material solids, for example, from 0.25 to 10 weight percent, or from 1 or 2 to 8 weight percent. When conductive carbon particles are included, the weight ratio of graphenic carbon particles to conductive carbon particles may typically range from 1:99 to 99:1 for example, from 80:20 to 20:80, or from 45:55 to 55:45.

In certain embodiments, the cathode coating material may include optional additives such as non-thermally produced graphenic carbon particles in a total amount of 10 weight percent. The non-thermally produced graphenic carbon particles may be obtained from commercial sources, for example, from Angstron, XG Sciences and other commercial sources. Other optional additives include surfactants, rheology modifiers, corrosion inhibitors and the like in a total amount of 15 weight percent.

In certain embodiments, the cathode coating material may be produced from a dispersion or a solution comprising an aqueous solvent or an organic solvent. Examples of organic solvents include N-methyl-2-pyrrolidone and the like. The amount of solvent contained in the dispersion may typically range from 25 to 90 weight percent, for example, from 40 to 75 weight percent, or from 55 to 70 weight percent.

As used herein, the term "graphenic carbon particles" means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled. The particles typically do not have a spheroidal or equiaxed morphology.

In certain embodiments, the graphenic carbon particles present in the electrode compositions of the present invention have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. In certain embodiments, the graphenic carbon particles may be from 1 atom layer up to 3, 6, 9, 12, 20 or 30 atom layers thick, or more. In certain embodiments, the graphenic carbon particles present in the compositions of the present invention have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1. In certain embodiments, at least a portion of the graphenic carbon particles may have lower aspect ratios, e.g., some of the particles may be substantially equiaxed or ball-like in shape.

In certain embodiments, the graphenic carbon particles used in the electrode compositions of the present invention have relatively low oxygen content. For example, the graphenic carbon particles used in certain embodiments of the compositions of the present invention may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles used in the electrode compositions of the present invention have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles used in the electrode compositions of the present invention have a typical Raman spectroscopy (532 nm laser) 2D/G peak ratio of from 0.5:1 to 1.5:1, for example, from 0.7:1 to 1.4:1. As used herein, the term "2D/G peak ratio" refers to the ratio of the intensity of the 2D peak at 2692 $cm^{-1}$ to the intensity of the G peak at 1,580 $cm^{-1}$.

In certain embodiments, the graphenic carbon particles used in the electrode compositions of the present invention have a typical Raman spectroscopy (532 nm laser) D/G peak ratio of from 0.3:1 to 0.9:1, for example, from 0.35:1 to 0.85:1, or from 0.45:1 to 0.65:1. As used herein, the term "D/G peak ratio" refers to the ratio of the intensity of the D peak at 1,350 cm$^{-1}$ to the intensity of the G peak at 1,580 cm$^{-1}$.

In certain embodiments, the graphenic carbon particles used in the electrode compositions of the present invention have a relatively low bulk density. For example, the graphenic carbon particles used in certain embodiments of the present invention are characterized by having a bulk density (tap density) of less than 0.2 g/cm$^3$, such as no more than 0.1 g/cm$^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of g/cm$^3$.

In certain embodiments, the graphenic carbon particles used in the electrode compositions of the present invention have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density (g/cm}^3\text{)} = \frac{0.1 \text{ grams}}{\Pi * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 g/cm$^3$, which is the density of graphite.

In certain embodiments, the graphenic carbon particles have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

In accordance with certain embodiments, percolation, defined as long range interconnectivity, may occur between the conductive graphenic carbon particles. Such percolation may reduce the resistivity of the coating compositions. In certain embodiments, the thermally produced graphenic particles may comprise particles having different morphologies, such as a bimodal distribution of plate-like particles having relatively high aspect ratios and generally equiaxed or ball-like particles having relatively low aspect ratios. The conductive graphenic particles may occupy a minimum volume within the coating such that the particles form a continuous, or nearly continuous, network. In such a case, the aspect ratios of the graphenic carbon particles may affect the minimum volume required for percolation. Furthermore, the surface energy of the graphenic carbon particles may be the same or similar to the surface energy of the elastomeric rubber. Otherwise, the particles may tend to flocculate or demix as they are processed.

The graphenic carbon particles utilized in the electrode compositions of the present invention can be made, for example, by thermal processes. In accordance with embodiments of the invention, thermally-produced graphenic carbon particles are made from carbon-containing precursor materials that are heated to high temperatures in a thermal zone such as a plasma. The carbon-containing precursor, such as a hydrocarbon provided in gaseous or liquid form, is heated in the thermal zone to produce the graphenic carbon particles in the thermal zone or downstream therefrom. For example, thermally-produced graphenic carbon particles may be made by the systems and methods disclosed in U.S. Pat. Nos. 8,486,363 and 8,486,364.

In certain embodiments, the graphenic carbon particles may be made by using the apparatus and method described in U.S. Pat. No. 8,486,363 at [0022] to [0048] in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to a temperature of at least 1,000° C. to form the graphenic carbon particles. In other embodiments, the graphenic carbon particles may be made by using the apparatus and method described in U.S. Pat. No. 8,486,364 at [0015] to [0042] in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system. In certain embodiments, the precursor material is heated to a temperature ranging from 3,500° C. to 20,000° C., such as 3,600° C. to 10,000° C. For example, the temperature of the thermal zone may range from 3,700 to 8,000° C., such as from 3,800 to 5,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

Without being bound by any theory, it is currently believed that the foregoing methods of manufacturing graphenic carbon particles are particularly suitable for producing graphenic carbon particles having relatively low thickness and relatively high aspect ratio in combination with relatively low oxygen content, as described above. Moreover, such methods are currently believed to produce a substantial amount of graphenic carbon particles having a substantially curved, curled, creased, buckled or equiaxed morphology (referred to herein as a "3D" morphology), as opposed to producing predominantly particles having a substantially two-dimensional (or flat) morphology. This characteristic is believed to be reflected in the previously described compressed density characteristics and is believed to be beneficial in the present invention because, it is currently believed, when a significant portion of the graphenic carbon particles have a 3D morphology, "edge to edge" and "edge-to-face" contact between graphenic carbon particles within the composition may be promoted. This is thought to be because particles having a 3D morphology are less likely to be aggregated in the composition (due to lower Van der Waals forces) than particles having a two-dimensional morphology. Moreover, it is currently believed that even in the case of "face to face" contact between the particles having a 3D morphology, since the particles may have more than one facial plane, the entire particle surface is not engaged in a single "face to face" interaction with another single particle, but instead can participate in interactions with other particles, including other "face to face" interactions, in other planes. As a result, graphenic carbon particles having a 3D morphology are currently thought to provide optimal conductive pathways in the present compositions and are currently thought to be useful for obtaining electrical conductivity characteristics sought by embodiments of the present invention.

In certain embodiments, the graphenic carbon particles may be treated in order to reduce or eliminate impurities. For example, thermally produced graphenic carbon particles may be treated to remove any polycyclic aromatic hydrocarbons (PAHs) by methods such as Soxhlet extraction using toluene, or the like.

The following examples are intended to illustrate various aspects of the invention, and are not intended to limit the scope of the invention.

EXAMPLES

Solvent grade N-methyl-2-pyrrolidone (Ashland, 570.7 grams) was added to a plastic container. While stirring with a Cowles Blade, Kynar HSV 900 PVDF (Arkema, 29.3 grams) was added in portions. Stirring was continued until the PVDF was completely dissolved. Multiple samples were prepared by mixing 32.79 grams of the PVDF binder solution with various types and amounts of carbonaceous additives, as listed in Table 1. An acrylic dispersant was used for the graphenic carbon particles instead of adding powder directly. The thermally produced graphenic carbon particles used in Sample Nos. 1-6 were produced by a thermal-production method utilizing methane as a precursor material disclosed in U.S. patent application Ser. No. 13/309,894. The thermally-produced graphenic carbon particles of Sample Nos. 1-6 were further treated with a toluene solution to extract any residual low molecular weight hydrocarbon contaminants. The xGNP-C300 graphenic carbon particles used in Sample Nos. 7-12 and the xGNP-C700 graphenic carbon particles used in Sample Nos. 13-18 were commercially available from XG Sciences. The Graphene X Technology graphenic carbon particles used in Sample Nos. 19-24 were commercially available from Graphene Technologies. The carbon black particles used in Sample Nos. 4-6, 10-12, 16-18, 22-24 and 25-27 were C-Nergy Super C65 particles from Timcal.

Each of the blends was placed in a dual-asymmetric centrifugal mixer and mixed at 2,350 rpm for 5 minutes. Lithium iron phosphate (LFP) was added to each mixed blend, and the resulting combination was subjected to a second mixing in a dual-asymmetric centrifugal mixer at 2,350 rpm for 5 minutes to produce formulated slurry. The electrically active lithium compound was lithium iron phosphate Life Power P2 lot#1110GY195 from Phostech Lithium, Inc. The slurries were formulated to contain about 35 weight percent solid fraction. Weight ratios of the components of the solid fraction are listed in Table 1.

For each sample, a wet film was prepared on pre-cleaned aluminum foil by a draw-down application of the formulated slurry using a doctor blade. Aluminum foil alloy 1085 from Targray was cleaned with acetone before the slurry was applied. Formulations were applied as wet films on the aluminum foil using a large automatic film coater (MSK-AFA-II from MTI Corporation) using an adjustable doctor blade at a rate of 89 mm/sec. This wet film was heated in an oven to a maximum temperature of 120° C. for at least 10 minutes. After cooling, an average dry film thickness (DFT) in microns was determined from five measurements with a micrometer and the average is shown in Table 1. Sheet resistance (Rs) was determined from three measurements made by firmly pressing a standard four-point probe (R-Check™ from EDTM, Inc.) on the coating surface. The average Rs is shown in Table 1. FIGS. 2-5 graphically illustrate sheet resistances of various samples listed in Table 1.

TABLE 1

| Sample No. | Thermally Produced Graphenic Carbon | xGNP-C300 | xGNP-C700 | Graphene X Technology | Carbon Black | LFP | Binder (%) | DFT (μm) | Resistance (Ω/□) |
|---|---|---|---|---|---|---|---|---|---|
| 1 | 5 | 0 | 0 | 0 | 0 | 90 | 5 | 123 | 2.5 |
| 2 | 3 | 0 | 0 | 0 | 0 | 92 | 5 | 119 | 18 |
| 3 | 1 | 0 | 0 | 0 | 0 | 94 | 5 | 106 | 211 |
| 4 | 2.5 | 0 | 0 | 0 | 2.5 | 90 | 5 | 108 | 78 |
| 5 | 1.5 | 0 | 0 | 0 | 1.5 | 92 | 5 | 111 | 112 |
| 6 | 0.5 | 0 | 0 | 0 | 0.5 | 94 | 5 | 98 | 285 |
| 7 | 0 | 5 | 0 | 0 | 0 | 90 | 5 | 107 | 2,480 |
| 8 | 0 | 3 | 0 | 0 | 0 | 92 | 5 | 111 | 1,618 |
| 9 | 0 | 1 | 0 | 0 | 0 | 94 | 5 | 87 | 1,387 |
| 10 | 0 | 2.5 | 0 | 0 | 2.5 | 90 | 5 | 74 | 337 |
| 11 | 0 | 1.5 | 0 | 0 | 1.5 | 92 | 5 | 83 | 547 |
| 12 | 0 | 0.5 | 0 | 0 | 0.5 | 94 | 5 | 97 | 1,039 |
| 13 | 0 | 0 | 5 | 0 | 0 | 90 | 5 | 102 | 4,360 |
| 14 | 0 | 0 | 3 | 0 | 0 | 92 | 5 | 99 | 3,997 |
| 15 | 0 | 0 | 1 | 0 | 0 | 94 | 5 | 86 | 1,421 |
| 16 | 0 | 0 | 2.5 | 0 | 2.5 | 90 | 5 | 79 | 551 |
| 17 | 0 | 0 | 1.5 | 0 | 1.5 | 92 | 5 | 83 | 950 |
| 18 | 0 | 0 | 0.5 | 0 | 0.5 | 94 | 5 | 84 | 1,298 |
| 19 | 0 | 0 | 0 | 5 | 0 | 90 | 5 | 125 | 2,610 |
| 20 | 0 | 0 | 0 | 3 | 0 | 92 | 5 | 130 | 3,760 |
| 21 | 0 | 0 | 0 | 1 | 0 | 94 | 5 | 79 | 3,983 |
| 22 | 0 | 0 | 0 | 2.5 | 2.5 | 90 | 5 | 100 | 266 |
| 23 | 0 | 0 | 0 | 1.5 | 1.5 | 92 | 5 | 106 | 793 |
| 24 | 0 | 0 | 0 | 0.5 | 0.5 | 94 | 5 | 94 | 1,630 |
| 25 | 0 | 0 | 0 | 0 | 5 | 90 | 5 | 76 | 247 |
| 26 | 0 | 0 | 0 | 0 | 3 | 92 | 5 | 78 | 589 |
| 27 | 0 | 0 | 0 | 0 | 1 | 94 | 5 | 85 | 1,619 |
| 28 | 0 | 0 | 0 | 0 | 0 | 95 | 5 | 60 | 4,337 |

The dry coated foils were passed through a roll calendar press (MTI Corporation) to achieve 25-30% compression. After vacuum drying, two coin-type half-cell batteries per dry coated foil were assembled using lithium metal as the anode and one-molar $LiPF_6$ in ethylene carbonate, diethyl carbonate and dimethyl carbonate solvents as the electrolyte. The coin cell batteries were then tested on a battery tester (Arbin Instruments) using a potential window of 4.1-2.5 Volts for 5 cycles each at currents corresponding to 0.2 C, 1.6 C, and 6.4 C charge/discharge rates, followed by 24 cycles at the current corresponding to a 1 C rate. For the dry coated foil made with C-Nergy Super C65 carbon black, for 5 cycles each at currents corresponding to 0.2 C, 0.4, 0.8, 1.6 C, 3.2 and 6.4 C, charge/discharge rates were used to better capture capacity losses. Discharge capacity in milliamp-hours per gram of lithium iron phosphate was calculated from the average of the first 5 cycles for each C-rate. "C-rate" refers to a current value that is required to fully discharge a cell having a constant electric capacitance in a time period equal to the inverse of the C-rate value in hours. For example, discharge capacity at 0.2 C refers to dry coated film capacity in milliamp-hours per gram of lithium iron phosphate at a current value required to fully discharge the battery in 5 hours. Similarly discharge capacity at 1 C refers to dry coated film capacity in milliamp-hours per gram of lithium iron phosphate at a current value required to fully discharge the battery in 1 hour.

Discharge capacity averages from the higher capacity coin-type half-cell of the two replicate cells for a given dry coated foil are listed in Table 2. Capacity retention was calculated from the quotient of the discharge capacity after the first charge-discharge cycle at 1 C and the last charge-discharge cycle at 1 C and reported as percentage according to the equation: 100×first cycle capacity/last cycle capacity.

TABLE 2

| | | Capacity (mAh/g) at various charge-discharge C-rates (hr$^{-1}$) | | | | |
|---|---|---|---|---|---|---|
| Conductive Carbonaceous Additive | DFT (μm) | 0.2 C | 1.0 C | 1.6 C | 6.4 C | % Capacity Retention after 24 cycles at 1.0 C |
| Thermally produced graphenic carbon particles | 87 | 157 | 151 | 147 | 116 | 97 |
| C-Nergy Super C65 | 86 | 155 | 112 | 37.7 | 0 | 37 |

Figure 6:
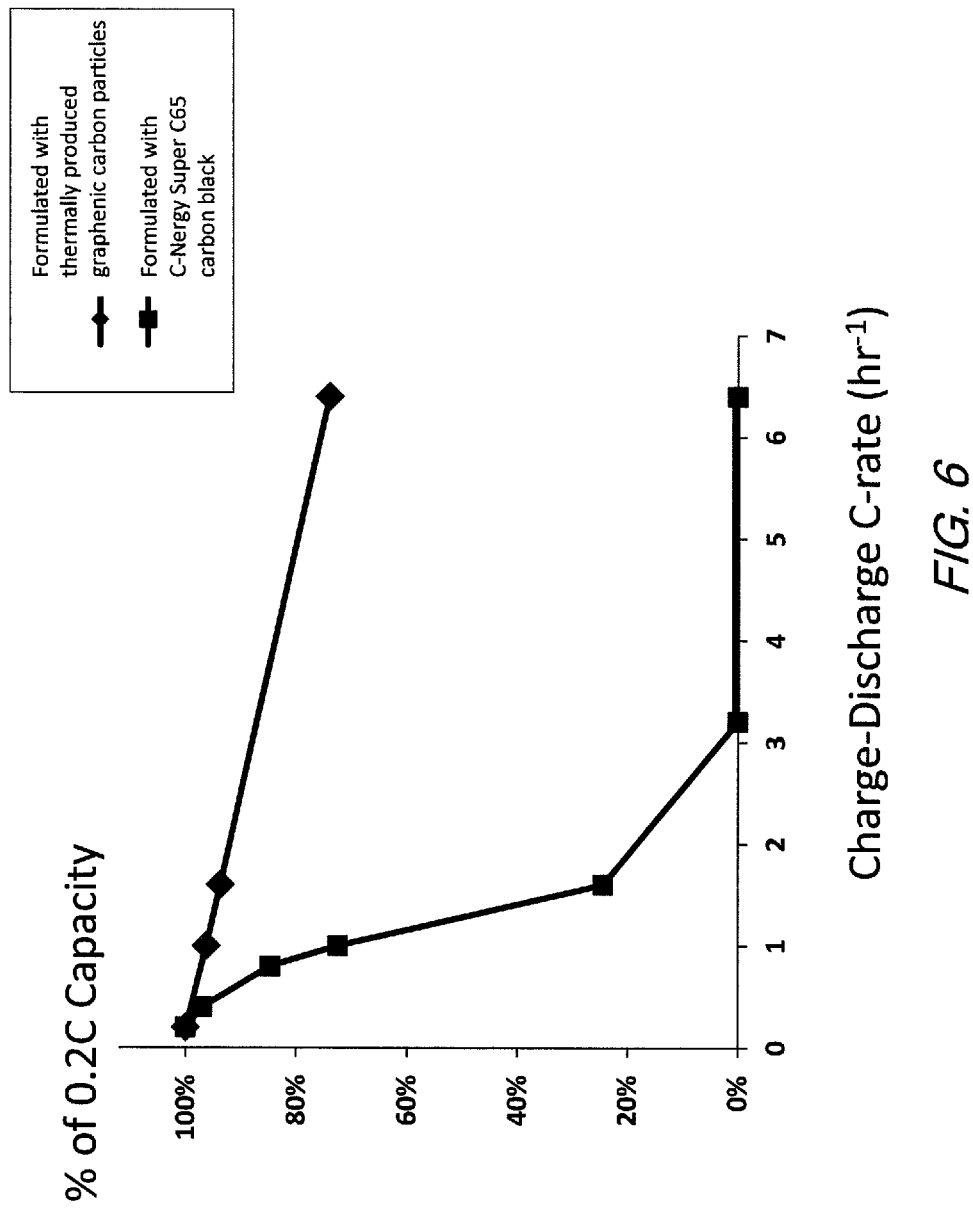
FIG. 6 is a graph of capacity loss versus discharge rates for test battery cells having different cathode materials.

FIG. 6 graphically illustrates the capacity at various charge-discharge C-rates corresponding to the values listed in Table 2.

The data in Table 2 and FIG. 6 demonstrates that thermally produced graphenic carbon particles of the present invention provides cathode coatings with high areal loading (DFT) with low capacity loss at high discharge rates, while conventional conductive carbon C65 suffers major capacity loss at high discharge rates. Similarly, cathode coatings made with thermally produced graphenic carbon particles of the present invention have higher capacity retention after multiple cycles.

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A lithium ion battery electrode material provided as a coating on a substrate, the coating comprising:
   from 80 to 99.5 weight percent of a lithium-containing active material;
   10 weight percent or less of thermally produced graphenic carbon particles; and
   a binder, wherein the coating has an electrical resistivity of less than 240 ohms/square.

2. The lithium ion battery electrode material coating of claim 1, wherein the thermally produced graphenic carbon particles comprise from 0.5 to 10 weight percent, and the binder comprises from 0.5 to 10 weight percent.

3. The lithium ion battery electrode material coating of claim 1, wherein the lithium-containing active material comprises from 87 to 99 weight percent, and the thermally produced graphenic carbon particles comprise from 1 to 8 weight percent.

4. The lithium ion battery electrode material coating of claim 1, wherein the lithium-containing active material comprises lithium iron phosphate, lithium cobalt oxide, lithium nickel cobalt aluminate, lithium manganate, lithium nickel cobalt manganate or a combination thereof.

5. The lithium ion battery electrode material coating of claim 1, wherein the thermally produced graphenic carbon particles have aspect ratios of greater than 3:1 and are produced in a thermal zone having a temperature of greater than 3,500° C.

6. The lithium ion battery electrode material coating of claim 1, wherein the thermally produced graphenic carbon particles have average thicknesses of from 0.3 to 6 nanometers.

7. The lithium ion battery electrode material coating of claim 1, wherein the thermally produced graphenic carbon particles have BET specific surface area of greater than 70 square meters per gram.

8. The lithium ion battery electrode material coating of claim 1, wherein the binder comprises a polymer selected from PVDF, acrylics or a combination thereof.

9. The lithium ion battery electrode material coating of claim 1, further comprising a dispersant.

10. The lithium ion battery electrode material coating of claim 1, wherein the substrate is conductive.

11. The lithium ion battery electrode material coating of claim 1, wherein the coating has a thickness of from 10 to 500 microns.

12. The lithium ion battery electrode material coating of claim 1, wherein the coating has a thickness of from 20 to 200 microns.

13. The lithium ion battery electrode material coating of claim 1, wherein the coating has an electrical resistivity of less than 100 ohms/square.

14. A lithium ion battery cathode material provided as a coating on a substrate, the coating comprising:
   from 80 to 99.5 weight percent of a lithium-containing active material;
   10 weight percent or less of graphenic carbon particles; and
   a binder, wherein the coating has an electrical resistivity of less than 200 ohms/square.

15. A lithium ion battery comprising:
   an anode;
   a cathode;
   a separator between the anode and the cathode; and
   an electrolyte in contact with the anode and the cathode,
   wherein the cathode comprises a coating on a substrate and the coating comprises from 80 to 99.5 weight percent of a lithium-containing active material, 10 weight percent or less of thermally produced graphenic carbon particles, and a binder wherein the coating has a thickness of from 10 to 500 microns.

16. The lithium ion battery of claim 15, wherein the substrate comprises a metal foil.

17. A lithium ion battery electrode material provided as a coating on a substrate, the coating comprising:
   from 80 to 99.5 weight percent of a lithium-containing active material;
   10 weight percent or less of thermally produced graphenic carbon particles;
   a binder; and
   a dispersant.

* * * * *